US009380363B2

(12) United States Patent
Loehr

(10) Patent No.: US 9,380,363 B2
(45) Date of Patent: Jun. 28, 2016

(54) NETWORK ELEMENT FOR SWITCHING TIME DIVISION MULTIPLEX SIGNALS

(75) Inventor: Juergen Loehr, Stuttgart (DE)

(73) Assignee: Alcatel Lucent, Boulogne-Billancourt (FR)

(*) Notice: Subject to any disclaimer, the term of this patent is extended or adjusted under 35 U.S.C. 154(b) by 77 days.

(21) Appl. No.: 14/237,184

(22) PCT Filed: Jul. 24, 2012

(86) PCT No.: PCT/EP2012/064453
§ 371 (c)(1),
(2), (4) Date: Feb. 5, 2014

(87) PCT Pub. No.: WO2013/029880
PCT Pub. Date: Mar. 7, 2013

(65) Prior Publication Data
US 2014/0177452 A1 Jun. 26, 2014

(30) Foreign Application Priority Data

Sep. 1, 2011 (EP) .................................... 11306089

(51) Int. Cl.
H04Q 11/04 (2006.01)
H04L 12/54 (2013.01)
(Continued)

(52) U.S. Cl.
CPC ........ *H04Q 11/0457* (2013.01); *H04L 12/5601* (2013.01); *H04L 49/3081* (2013.01); *H04L 49/9057* (2013.01); *H04L 61/2069* (2013.01); *H04L 2012/5626* (2013.01)

(58) Field of Classification Search
CPC ........... H04Q 11/0457; H04L 61/2069; H04L 49/9057; H04L 12/5601; H04L 49/3081; H04L 2012/5626

USPC .............. 370/241, 241.1, 351, 352, 355, 357, 370/360, 389, 395.1, 398, 395.3, 464, 465, 370/470, 471, 474
See application file for complete search history.

(56) References Cited

U.S. PATENT DOCUMENTS 6,055,235 A 4/2000 Blanc et al.
6,621,828 B1 9/2003 Field et al.
(Continued)

FOREIGN PATENT DOCUMENTS

CN 101064697 10/2007
EP 1385296 10/2004
(Continued)

OTHER PUBLICATIONS

International Telecommunication Union; ITU-T; Network Node Interface for the Synchronous Digital Hierarchy (SDH); ITU-T Recommendation G.707/Y.1322; Jan. 2007; 196 pages.
(Continued)

Primary Examiner — Obaidul Huq
(74) Attorney, Agent, or Firm — Patti & Malvone Law Group, LLC

(57) ABSTRACT

A network node, which is designed for switching of time-division multiplex signals; contains a number of line cards (LCI-LCn), a switch fabric (SF) interconnecting the line cards (LCI-LCn), and a control system (CS). The switching fabric (SF) is a cell based switch with one or more switch modules (SET-SEn) adapted to switch cells of a predefined cell format on the basis of addresses contained in cell headers of the cells. The line cards (LCI-LCn) have segmentation and reassembly devices (SARI-SARn) for segmenting input time-division multiplex signals into cells of the preformed cell format and adding address information to each cell and for reassembling cells received from said switch fabric (SF) into output time-division multiplex signals. The control system (CS) is connected to a switched port of the switch fabric (SF) and exchanges with the line cards (LCI-LCn) control and/or Operation, Administration and Maintenance (OAM) messages over the switch fabric (SF) using cells of the preformed cell format.

19 Claims, 5 Drawing Sheets

(51) Int. Cl.
*H04L 12/935* (2013.01)
*H04L 12/861* (2013.01)
*H04L 29/12* (2006.01)
*H04L 12/70* (2013.01)

(56) References Cited

U.S. PATENT DOCUMENTS

| | | | |
|---|---|---|---|
| 6,687,225 B1* | 2/2004 | Kawarai et al. | 370/230.1 |
| 2005/0243732 A1* | 11/2005 | Bitar et al. | 370/241.1 |
| 2010/0157994 A1* | 6/2010 | Beisel et al. | 370/355 |
| 2012/0170575 A1* | 7/2012 | Mehra | 370/359 |

FOREIGN PATENT DOCUMENTS

| | | |
|---|---|---|
| EP | 2200200 | 4/2011 |
| JP | 2000286900 | 10/2000 |
| JP | 2005354185 | 12/2005 |
| WO | 2010069884 | 6/2010 |

OTHER PUBLICATIONS

International Telecommunication Union; ITU-T; Interfaces for the Optical Transport Network (OTN); ITU-T Recommendation G.709/Y.1331; Dec. 2009; 218 pages.

\* cited by examiner

NETWORK ELEMENT FOR SWITCHING TIME DIVISION MULTIPLEX SIGNALS

FIELD OF THE INVENTION

The present invention relates to the field of telecommunications and more particularly to a network element and related method for switching time-division multiplex signals in a transport network.

BACKGROUND OF THE INVENTION

While packet switched services are currently on the rise, transport networks today still rely mainly on circuit switched technology such as SDH (Synchronous Digital Hierarchy), SONET (Synchronous Optical Network), and OTN (Optical Transport Network), where constant rate transport signals transport time-division multiplexed subrate signals. Payload signals are mapped into multiplex units, which in SDH/SONET are termed virtual containers and in OTN are termed ODUk. A multiplex unit represents an end-to-end path through the network and connections in the network are established by configuring the network elements to semi-permanently switch the corresponding multiplex unit, which is present at the same relative position in all consecutive transport frames, along that path.

Network elements are for example add/drop multiplexers and digital crossconnects. Such network elements contain I/O (input/output) ports and a switch matrix interconnecting the I/O ports. The switch function which needs to be performed on the level of multiplex units to establish paths in the network encompasses switching in both, space and time domain, i.e. between different I/O ports and between different timeslot positions. Typically, the transport signals are retimed and aligned at the input port and the switch function is performed on time slots of the aligned signal in synchronism with a common system clock in accordance with a pre-configured interconnection map. Such network elements typically use specialized integrated circuits for I/O and switching functions.

A network node, which makes use of a self-routed cell fabric is known from EP2200200B1. Time-division multiplexed signals are segmented at the input into cells of same length and address information is added to each cell. A first address portion is used in the cell switch for space switching and a second portion is used in on the respective output line card for switching cells belonging to a certain timeslot in the time domain. This mentioned address information is local to the network node, i.e. not visible outside.

SUMMARY OF THE INVENTION

A network node, which is designed for switching of time-division multiplex signals; contains a number of line cards, a switch fabric interconnecting the line cards, and a control system. The switching fabric is a cell based switch with one or more switch modules adapted to switch cells of a predefined cell format on the basis of addresses contained in cell headers of the cells. The line cards have segmentation and reassembly devices for segmenting input time-division multiplex signals into cells of the predefined cell format and adding address information to each cell and for reassembling cells received from said switch fabric into output time-division multiplex signals. The control system is connected to a switched port of the switch fabric and exchanges with the line cards control and/or Operation, Administration and Maintenance (OAM) messages over the switch fabric (SF) using a cell format.

TDM signals in transport network contain overhead information for operation, administration, and maintenance (OAM) purposes, including performance monitoring, failure detection, alarm propagation, protection switching and many others. Certain overhead information is typically terminated at the line cards and collected or processed by a central control system. Certain functional blocks on the line cards further need to be configured by the control system. Usually, a dedicated interface between the control system of the network node and the line cards, such as an Ethernet interface, is provided for such kind of OAM information exchange.

For the transport of such control and meta information between line cards and the processing functions of the control system, use is made of the cell switch fabric which also implements the TDM circuits. The meta data are transported in separate flows between line cards and control system, similar to TDM circuits between the line cards. This avoids the need for a separate communication function by reusing the cell switch and guarantees reserved bandwidth, latency limits and failure redundancy provided by the cell switch for communication between the line cards and the control system. Quality of Service guarantees are needed to transport TDM traffic, anyway, and are reused for the above purposes. Therefore, no further complexity is added to the cell fabric and its use.

Saving a separate communication function is especially beneficial in multi-shelf implementations of the network node, since the communication function has to cover specific needs with respect to redundancy and scalability in this case, which is not needed using the invention.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
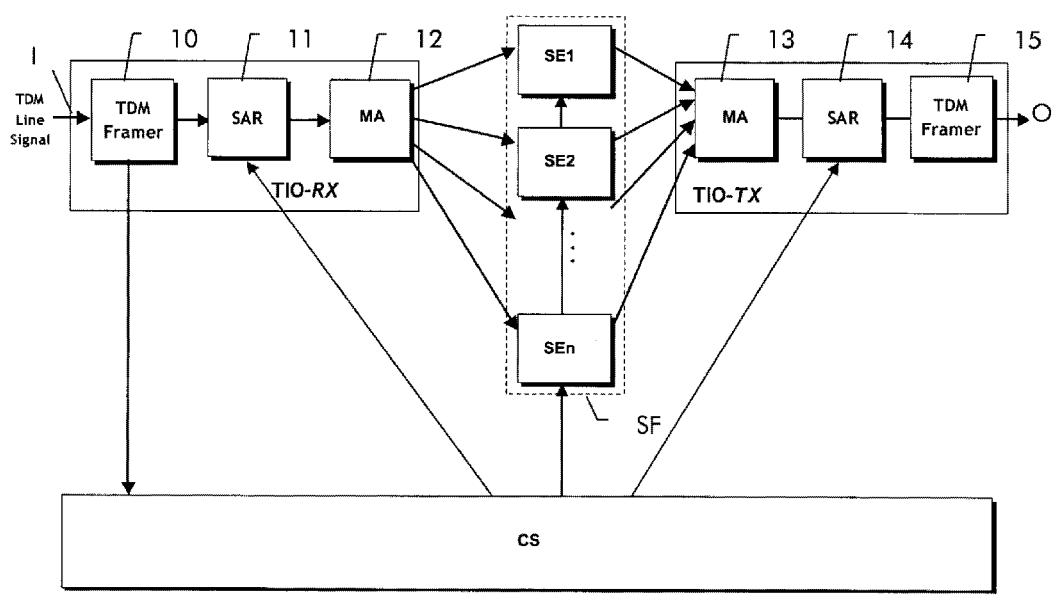
FIG. 1 shows the known architecture of a network element with a cell-based switch fabric.

A network element with a self-routing cell-switched switch fabric is shown in FIG. 1. It contains a number of input ports and output ports. For the sake of simplicity, only one input port I and only one output port O are shown. Input ports and output ports are arranged on line cards TIO. Line cards contain receiver function RX and transmitter functions TX. In FIG. 1, only one receiver function TIO-RX and only one transmitter function TIO-TX is shown. It should be clear however, that a network node in a real application has a number of line cards, such as for example 32. Moreover, each line card can accommodate more than one input and corresponding output ports. In an embodiment, each line card has 8 input ports for 10 Gb/s TDM signals and 8 corresponding outputs ports. In total this would add up to a system capacity of 2.5 Tb/s.

The line cards are connected to a switch fabric SF, which is built from a number of switch modules SE1-SEn. These modules SE1-SEn are, in cooperation with matrix adapters MA, self-routing switch elements with full-duplex switching capacity, which support cell switching. Such switch modules are commercially available on the market and are typically used for switching of Ethernet traffic or other kind of packet switched traffic. Such switch modules are off-the-shelf components produced in relatively large quantities. Reuse of these devices for TDM applications allows to build large network elements using newest technology with the highest level of integration at moderate price.

In an embodiment, the network node can have a system capacity of 2.5 Tb/s. The switch fabric SF contains 20 switch modules arranged on 5 fabric cards plus additional 12 switch modules arranged on 3 fabric boards for equipment protection and load sharing purpose. Each switch module has a switch capacity of 64×64 lines at 6.25 Gb/s. It should be understood that this choice and dimensioning is just an example and could be scaled as needed and as components are available.

The line cards TIO contain a TDM framer 10, a module for a segmentation and reassembly (SAR) function 11, and a matrix adapter (MA) 12. In receive direction (ingress side), the TDM framer 10 terminates the transport overhead of received transport signals. Additionally, the framer also performs a retiming and alignment function for the received signals. The SAR module 11 extracts the multiplex units from timeslots in the received TDM signals and convert these into a cell format. The SAR module also inserts into each cell a cell header that contains address information as will be described below in more detail. The matrix adapter 12 distributes the cells to the switch elements SE1-SEn of the switch fabric SF. Such matrix adapters are also commercially available on the market for use in Ethernet or packet switching applications.

In addition, the network element contains a control system CS, via which the line cards can be configured as will be explained below in more detail. The control system CS also receives overhead information terminated in the receive side TDM framer, and provides overhead information to be inserted by the transmit side TDM framer.

The transmit side (egress side) of a line card TIO-TX is shown on the right hand side of FIG. 1. In transmit direction, a matrix adapter 13 receives cells from the switch matrix SM, orders these and feeds them to a SAR module 14.

The SAR module extracts the useful data from the received cells and reassembles these into multiplex units. A TDM framer 15 maps the multiplex units into newly generated TDM frames for onward transmission.

As explained, signal flow in FIG. 1 is from the left to the right. A TDM line signal structured into frames of same length is received at input port I. In the embodiment, the line signal may be an STM64 signal which has a capacity of 10 Gbit/s. An STM64 frame contains 64 higher order multiplex units VC-4. Alternatively, a line signal multiplexed of 4×STM16 or 16×STM4 or combinations thereof can be used. Moreover, the SONET equivalent STS-192 can equally be used as line signal. In any case, the switching granularity is chosen as STS-1, which corresponds to ⅓ STM1. This is, however, only an internal switching entity while frame processing is done prior to the switching, so that STM1 for example can be switched as 3 independent "pseudo" STS-1. The actual frame processing is done by the TDM framer 10, which terminates the section overhead of the STM64 frames and processes their AU pointers.

The same can be applied in a similar way to OTN OTM-m.n/OTUk signals and the ODUk multiplex units transported in the OTUk.

The output of TDM framer 10 is a continuous bitstream, still structured into frames but synchronized to a local clock and with the frame header (section overhead) extracted. The multiplex units will be found in fixed time slots within each frame. The SAR module 11 extracts the multiplex units from the time slots and converts these into a cell format by segmenting the bitstream into 60 B payload cells. The output of SAR module 11 has a cell format with 60 B payload, 4 B address overhead and an additional 8 B cell header which contains framing and CRC bytes.

The interface between the MA 12, 13 and the switch fabric SF is a proprietary interface with a 9 byte cell header, which additionally contains a timestamp that takes care of the order of the cells at the transmit side MA 13.

The 4 B address field contains a 2 B fabric header and a 2 B TDM header. The fabric header is looked at by the switch fabric. It contains an address that addresses the output port to which the cell is going. Since each line card carries 8 output ports, the fabric header contains 11 bits which identify the destination MA and 4 bits which identify the output port served by that destination MA. The first bit is used to distinguish unicast from multicast connections as will be explained in more detail further below. In case of unicast connections, this bit is set to '0'.

The TDM address is looked at by the transmit side SAR module and contains a 16 bit egress identifier. The least significant 8 bits indicate the time slot of the output signal to which the cell belongs. Since the network element in the embodiment switches in granularity of STS-1 (Synchronous Transport Signal level 1), there are 192 timeslots in a 10G output signal (STM64 or STS-192). Hence, 8 bits are sufficient to address these ($2^8$=256). The most significant 8 bits identify the 10G signal, to which the timeslot belongs into which the cell payload will be mapped. This may seem redundant in view of the information of the fabric header H1, H2, but proves useful when multicast connections are involved, for example for protection switching, to identify the signal in the system unambiguously.

For the envisaged TDM application, it is preferable to use cells of a predefined, fixed length. It should be noted, however, that available cell fabric elements can also support cells of variable length.

A network node as shown in FIG. 1 is known per se from EP2200200B1, which is incorporated by reference herein. In this network node, the interconnection between the local control system CS and the various line cards and matrix boards is implemented through direct interconnections in the form of a local area network such as an Ethernet.

In summary, connectivity is provided by setting the cell addresses at ingress side. The fabric address addresses the destination MA port and the TDM address addresses the outgoing timeslot. The connectivity of the fabric SF is evaluated by the control system CS and downloaded into the segmentation and reassembly (SAR) function of the line cards. Destination headers for the whole fabric are calculated taking into account path (SNCP) and line switching functions (MSP) at a rate 200 times per second (5 ms cycle). Every 5 ms the complete connectivity is downloaded into line cards and fabric devices SE1-SEn. Fabric SE1-SEn devices need to be configured for multicast connectivity only.

Figure 2:
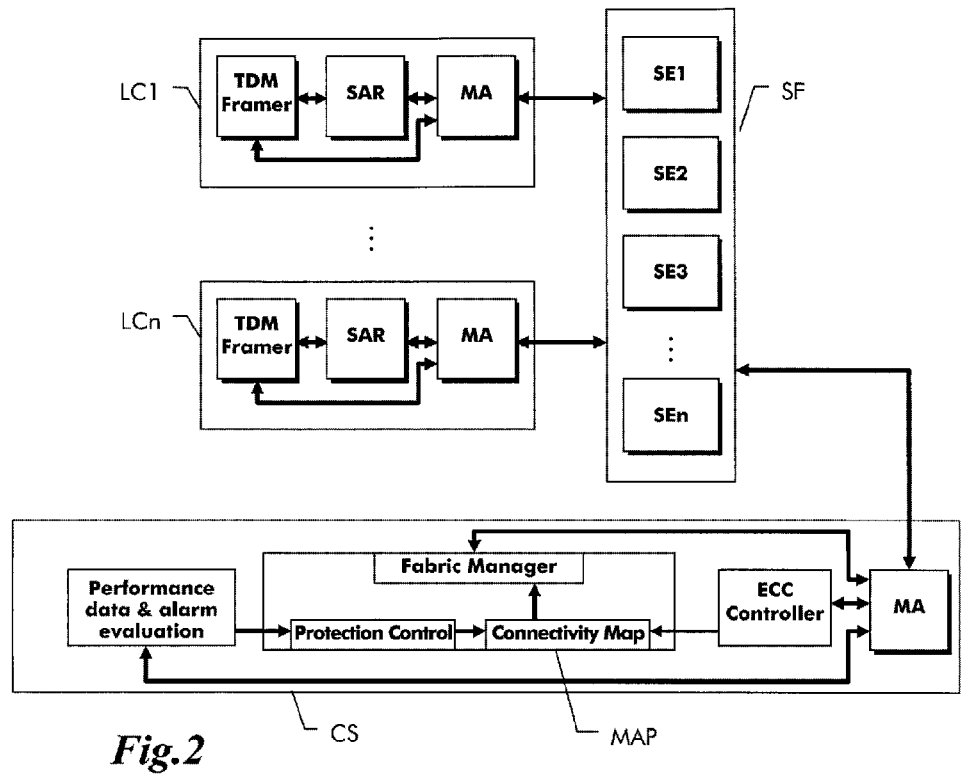
FIG. 2 shows a node architecture, where internal OAM communication is routed through the cell based switch fabric.

An improved embodiment of such a network node is shown FIG. 2. The network node has a number of line cards LC1-LCn, which are connected to a switch fabric SF. Switch fabric SF is a cell based, self-routing switch fabric of the type described above. Each line card LC1-LCn has a TDM framer, a SAR module, and a matrix adapter MA. A control system CS contains a fabric manager for configuring crossconnections through the network node, a performance and alarm evaluation control block and an ECC controller, which handles embedded communication channel traffic, e.g., for control plane and management plane communication.

According to an aspect of the invention, internal control and OAM communication between line cards LC1-LCn and control system CS is routed through the switch fabric SF. For this purpose, the control system CS is equipped with an additional matrix adapter MA and any control and OAM messages are encapsulated into cells, similar to those used for segmented TDM traffic signals. Local addresses are used in the cell headers to route control and OAM cells between the various functional entities of the line cards and the control system.

It should be understood that the cell format used for internal control and OAM messages is not necessarily the same that is used for TDM circuits, but can use any cell format supported by the matrix adapters and fabric elements. In particular, for certain applications, cells of variable length can be used, while the cell format for TDM circuits preferably uses fixed-length cells.

The TDM framers on line cards LC1-LCn terminate the overhead of received line signals and forward overhead information like failures messages, protection switching protocols, detected errors, and management communication signals to control system CS. The TDM framers also receive management communication signals and other information from control system CS for insertion into the signal overhead in transmit direction.

This internal signal exchange is implemented using cells with internal addresses, which are routed through switch fabric SF. For this purpose, a connection between TDM framers and corresponding matrix adapters MA exist on the line cards LC1-LCn, thus bypassing the segmentation and reassembly blocks SAR.

As has been explained above, crossconnections for TDM flows are implemented through proper addressing in the cell headers. Therefore, in order to provision crossconnections, the control system configures the SAR functions in the line cards to insert appropriate cell addresses into the cells of the segmented TDM flows. The control information to configure the SAR functions in the line cards is also communicated in the form of cells switched from the control system through the switch farbric to the corresponding line cards. An internal address is used in such control cells to address the individual SAR functional blocks.

Figure 3:
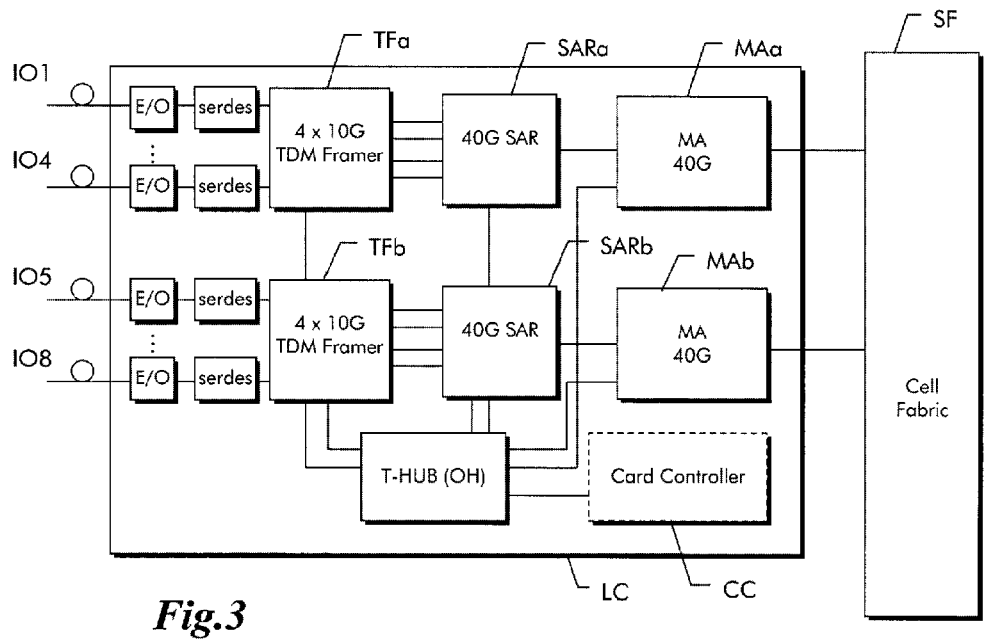
FIG. 3 a block diagram of a line card used in the network node of FIG. 2.

A line card LC for the network node of FIG. 2 is shown in FIG. 3. It contains 8 I/O ports IO1-IO8 for connecting optical fiber links. Each I/O port IO1-IO8 is equipped with an E/O converter (electrical/optical) connected to a Serializer/Deserializer (Serdes), which converts data between serial and parallel interfaces in each direction. The line card LC further contains two framer circuits TFa, TFb, each framer circuit TFa, TFb serves four I/O ports and has a capacity of 4×10G. Each of the two framer circuits TFa, TFb is connected to a SAR module SARa, SARb, which also has a capacity of 40G, and each of the two SAR modules SARa, SARb connects to a matrix adapter MAa, MAb. The two matrix adapters MAa, MAb each are connected via a 4 lane wide interface to the switch fabric SF. It should be noted that all functions of the line card LC are bidirectional and contain receive and transmit functionality. Interconnections on the line card LC as well as external fiber connections are shown schematically are preferably implemented as distinct physical connections for the two directions of transmission.

The line card LC further contains hub circuit T-HUB, which serves as a bridge and interconnects different type if chip interfaces. Hub circuit T-HUB is connected to both framer circuits TFa, TFb, to both SAR modules SARa, SARb, and to both matrix adapters MAa MAb. OAM and control cells can be received from cell fabric SF at either of the two matrix adapters MAa, MAb and forwarded though hub circuit T-HUB to a SAR module SARa, SARb or framer circuit TFa, TFb for which these are destined. Conversely, terminated overhead information and other OAM signals can be encapsulated at either framer circuit TFa, TFb or any of the SAR modules into cells and sent directly over hub circuit T-HUB to the corresponding matrix adapter MAa, MAb for onward transmission to control system CS.

Optionally, an additional card controller CC can be provided, which is also connected to hub circuit T-HUB, which manages and configures the line card under control of control system CS. It is however equally possible that control system CS manages and configures the framer and SAR modules directly via hub T-HUB and can hence take over the functions of the card controller CC, so that a line card can also be implemented without a separate card controller.

Each SAR module segments the timeslots from the received TDM signals into cells and assigns the fabric and TDM addresses. These addresses are preconfigured by control system CS. The MA is a standard component for Ethernet and other packet switching devices and provides in cooperation with the cell based switch fabric SF an interconnection function to the transmit side MA, which distributes received cells in accordance with the 4 destination interface bits to the appropriate output port.

Figure 4:
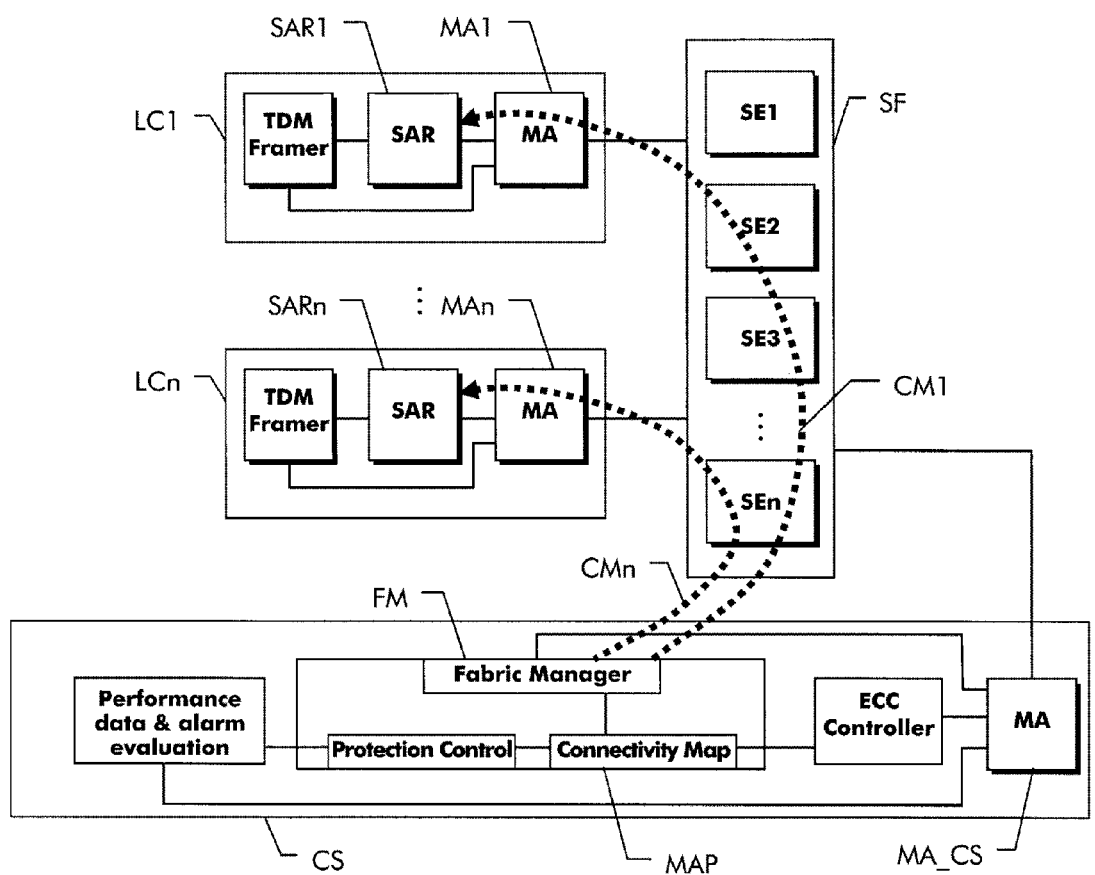
FIG. 4 shows information exchange to configure crossconnections through the network node of FIG. 2.

FIG. 4 shows an example, how crossconnections through the self-routed cell switch SF will be provisioned. The control system CS contains a fabric manager FM, which has access to a connectivity map MAP. Connectivity map MAP contains the configuration data about all established crossconnections, i.e. which timeslot from which input is connected to which timeslot of which output. Crossconnections are semi-permanent connections, which exist until the connectivity map is reconfigured due to management request or execution of a protection switch event.

In order to establish a crossconnection, the SAR function at the respective input port needs to be configured to add an appropriate address into the header of each subsequent cell, that corresponds to the timeslot to be crossconnected. According to the embodiment, a configuration message, which has the cell format required by switch fabric SF, is sent from fabric manager FM through switch fabric SF to the SAR function of the respective input to be configured. The cell with the configuration message contains in its header a local address that relates to the destined SAR functional block.

The configuration message cell is sent from the fabric manager FM to the matrix adapter MA_CS of the control system CS. Through cell switch fabric SF, the configuration message cell is switched to the matrix adapter MA of the output line card, where the destined SAR functional block resides. From the matrix adapter MA, the configuration message cell goes via hub circuit T-HUB (see FIG. 3) to the destined SAR function.

In the embodiment of FIG. 4, it is assumed by way of example that a crossconnection shall be established from a timeslot A at an input port of line card LC1 to another timeslot B at an output port of line card LCn. The connectivity map MAP is hence reconfigured to reflect the new crossconnection and fabric manager FM sends a configuration CM1 message to SAR function SAR1 on line card LC1, which contain the address information where cells with segmented data from timeslot A of the respective input shall be sent to. This address information contains a 16 bit fabric address that addresses the output port to which the cell will be switched plus an 8 bit TDM address that addresses the output timeslot. As described before, each line card carries 8 output ports. The fabric address therefore contains 11 bits which identify the destination MA and 4 bits which identify the output port served by that destination MA. The first bit is set to '0' and indicates that the new crossconnection is a unicast connection.

Fabric manager FM additionally sends a second configuration message cell CM2 to SAR function SARn of line card LCn to inform about the new crossconnection. This is useful because if SAR function SARn would receive cells of the new crossconnection without knowing that a corresponding crossconnection has been set up, it would assume that there is a connection mismatch and so it would generate a connection mismatch alarm and drop the cells belonging to this crossconnection.

Moreover, it is advantageous that SAR functions SAR1 and SARn send back acknowledgment message cells to fabric manager to acknowledge proper receipt and execution of the configuration request. Upon receipt of the acknowledgment, the status of the new crossconnection in connectivity map MAP is changed from pending to provisioned.

Further to the above explained address mechanism, which allows to switch TDM sub-signals in time and space domain from one input port to one output port, the network element of the embodiment additionally provides the ability to send an input signal to more than one output port. Such connections are termed multicast connections. For this, the fabric address in the cell headers is replaced by a 15 bit multicast address and the fabric modules SE1 to SEn and MAs are configured to switch cells carrying a certain multicast address to the appropriate multiple output ports. Such multicast connections are primarily used for protection switching, where an input signal needs to be sent over redundant links. In case of a multicast connection, the first bit of the fabric header is set to '1'. To implement such multicast connections, the fabric manager sends configuration message cells not only to the SAR functions in the respective line cards, but also sends configuration message cells to the fabric modules SE1-SEn and the destination matrix adapters.

Figure 5:
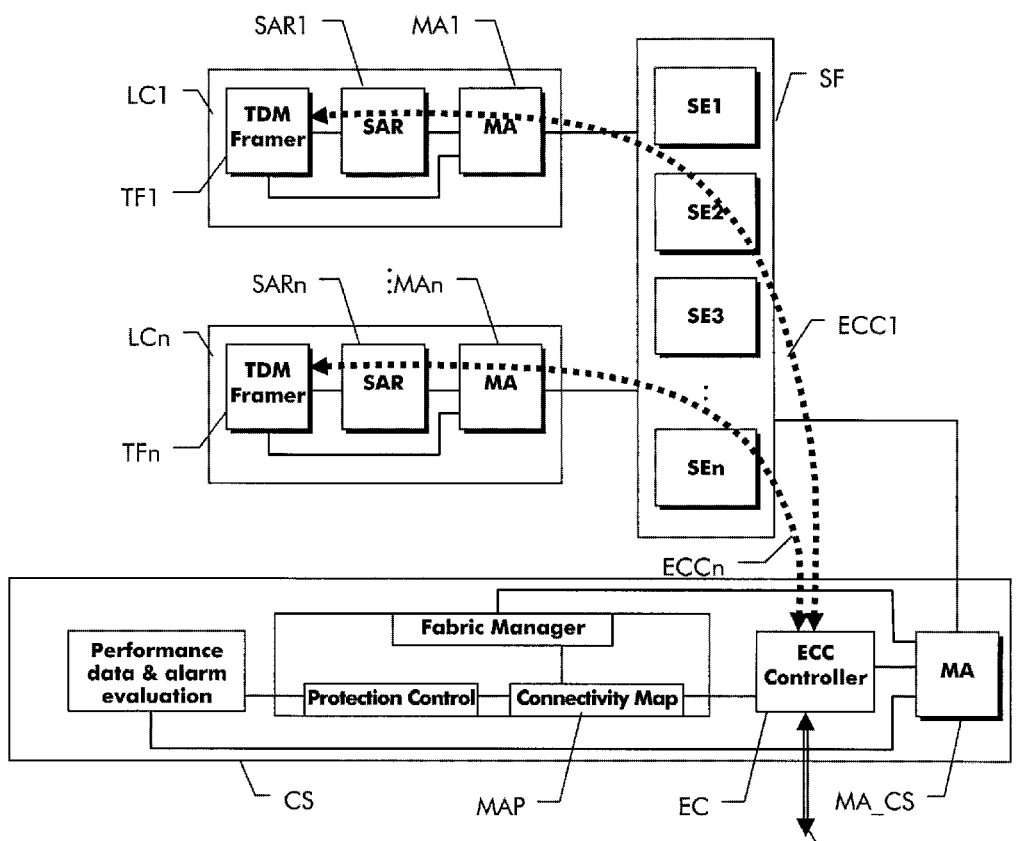
FIG. 5 shows routing of communication channel data in the network node of FIG. 2.

A second embodiment of node-internal control and OAM signalling using self-routed cells is shown in FIG. 5. As explained above, each line card has a TDM framer, which terminates overhead bytes of received TDM signals and inserts overhead bytes into TDM signals to be transmitted. One part of the overhead is referred to as the embedded communication channel (ECC), which uses one or more bytes in the overhead of TDM signals.

The ECC is used for communication between a network management system and the nodes in the network, and for communication between network nodes. Such communication includes alarm propagation, configuration of network nodes, collection of performance monitoring data, and many others.

The ECC can also be used for communication within a control plane between distributed control plane controllers locally associated to the network nodes. Control plane communication uses the GMPLS/ASON protocol suite for provisioning of connections and exchange of topology and link state information.

The ECC is hence used for the communication between network elements, with the purpose to be part of the DCN (Data Communication Network), supporting management and supervision of network elements. Instances of an ECC are the DCC bytes in the section overhead of SDH/SONET signals (ITU-T G.707) and the GCC bytes in the OTUk/ODUk overhead of OTN signals (ITU-T G.709).

Communication on the ECC typically uses IP- or OSI-based routed packet protocols. Any packet traffic on the ECCs, which are terminated on the line cards, go to a routing function in the network node, which decides for each packet based on a packet addresses and a local routing table to which output ECC the packet needs to be forwarded. A more detailed overview over ECC communication can be found in EP1385296B1, which is incorporated by reference herein.

The routing function in the embodiment of FIG. 5 is implemented the ECC controller EC, which is part of control system CS. Instead of an Ethernet interface and connection between each line card and the ECC controller, cell switched flows are implemented through switch fabric SF between the TDM framers that terminate the ECCs, respectively, and ECC controller EC.

The ECC controller EC is attached though matrix adapter MA_CS to the switch fabric SF and can communicate via the cell switch towards the line cards LC1-LCn of the node. Separate bidirectional flows ECC1-ECCn are provisioned for each ECC channel via the cell switch SF. Those flows correspond to the properties of the respective ECC channel, e.g. implement a reserved bandwidth of 192 MBit/s for a DCC-R channel and 576 MBit/s for a DCC-M channel. The specific bandwidth for OTUk/ODUk GCC0/1/2 depends on the value of k.

The cell flows ECC1-ECCn between the ECC controller EC and the line cards LC1-LCn are instantiated as bidirectional, constant bitrate flows when the related ECC is terminated and configured to be used as a DCN link, e.g. by provisioning of the ECC termination and instantiation of a related IP or OSI interface for routing and forwarding of IP/OSI traffic by a network management system. This provisioning is done separately and independently for each ECC.

ECC controller EC is an IP and/or OSI router implementing the necessary routing protocols, e.g. OSPF, IS-IS, and the OSI reference model layer 3 forwarding (IP and/or OSI). It may additionally have other DCN interfaces, e.g. LAN interfaces.

In FIG. 5, TDM framer TF1 on line card LC1 terminates a TDM signal received at line card LC1. The ECC bytes of the received TDM signal contain IP packets for management plane communication. For instance the ECC can carry IP packets of management messages which are destined to the local node as well as other IP packets destined to a network node that is connected to line card LCn.

TDM Framer TF1 takes all IP packets from the terminated ECC, chops the packets into segments of equal length and maps these segments into cells of the cell format required by cell switch fabric SF. Each of these ECC cells will have in its header the local address of ECC controller EC.

Via hub T-HUB (see FIG. 3) these ECC cells are forwarded to matrix adapter MA1, thus bypassing SAR module SAR1. Matrix adapter MA1 sends the ECC cells through switch fabric SF to matrix adapter MA_CS of control system CS. Matrix adapter MA_CS forwards to cells to ECC controller EC.

ECC controller EC reassembles all ECC cells received from matrix adapter MA_CS and processes the IP headers of the IP packets contained in the cells. IP packets destined for the local node will be evaluated by ECC control EC, potentially forwarded via LAN Interface (FIG. 5) to a node local controller, and IP packets destined for other nodes will be forwarded to respective TDM framers on the line cards.

For example some of the IP packets can contain a management message from a network management system requesting to set up a new crossconnection (as in the embodiment of FIG. 4). ECC controller EC will evaluate this message and add the requested crossconnection to the configuration data of connectivity map MAP. ECC controller EC will then reply to the request by sending back an IP packet with an acknowledgment. ECC controller EC will chunk the IP packet with the acknowledgment message into segments and map these into cells for switching through switch fabric SF. The cells will be addressed for TDM framer TF1 on line card LC1, where the IP packet is reassembled and put into the ECC of the outgoing TDM signal.

IP packets destined for other nodes will be directed to the appropriate line cards for onwards transmission. For example, an IP packet can be addressed to a network node connected through an optical link to line card LCn. ECC controller EC or another node local controller will make a routing decision based on its routing table and the destination IP address and hence map the respective IP packet into cells again and address these cells to the TDM framer TFn on line card LCn. TDM framer TFn will reassemble the received cells and put these into the ECC of its transmit TDM signal.

Figure 6:
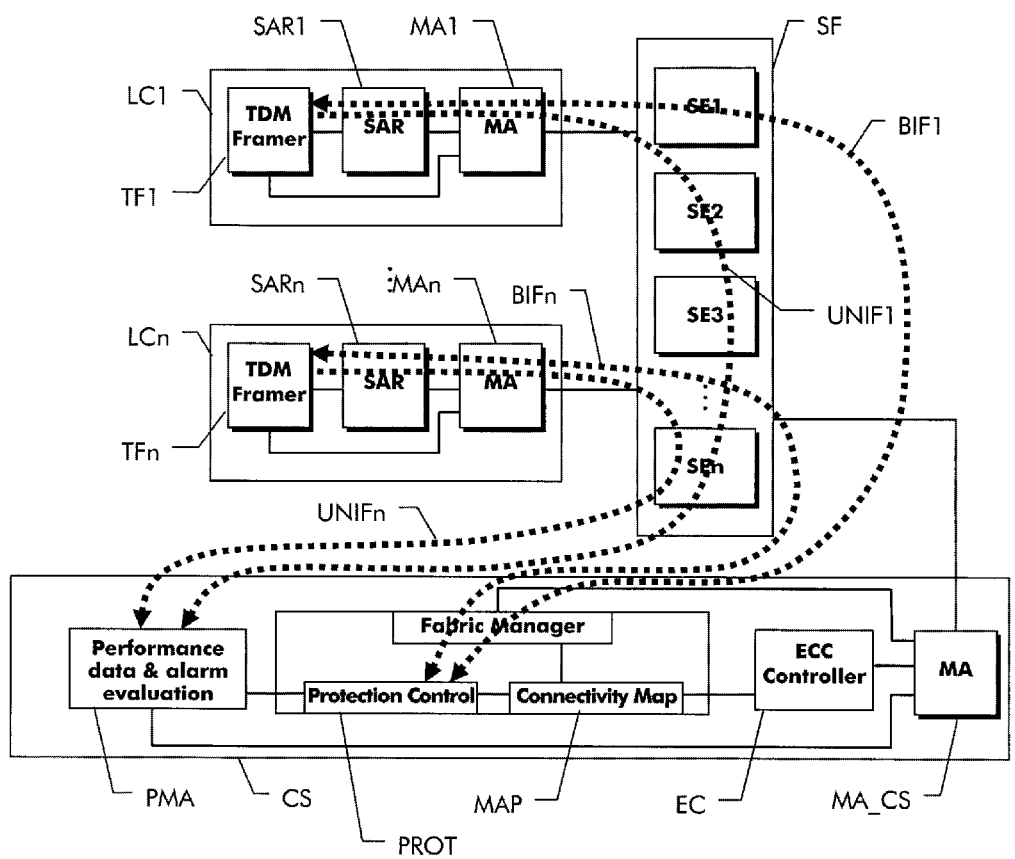
FIG. 6 shows communication of overhead information between line cards and central control in the network node of FIG. 2.

FIG. 6 shows an embodiment for the handling of TDM meta information in the network node of FIG. 2. Such meta information contains overhead information in the overhead bytes of the received TDM signals as well as information derived out of this overhead information and other signal characteristics. In particular, this includes defects and alarms derived from incoming TDM signals for reporting and protection switching, performance data derived from incoming TDM signals for aggregation and subsequent reporting, overhead channels used for OAM purposes and protection communication for aggregation, reporting and protection switching.

The TDM framers TF1-TFn contain functions for inserting and extracting the overhead information from/to overhead bytes of TDM signals, while the processing functions for processing the information, e.g. filtering, aggregation, protection switching, reporting, are shared between the line cards LC1-LCn and one or several processing instances of the control system CS.

For the transport of the meta information between line cards LC1-LCn and the processing functions of the control system CS, use is made of the cell switch fabric SF which also implements the TDM circuits. The meta data are transported in separate flows between line cards LC1-LCn and control system CS, similar to TDM circuits between the line cards LC1-LCn.

In the receive side line card, TDM framers TD1-TFn terminate the relevant section and path overhead of received TDM signals and extract control bytes therefrom. The TDM framers detect line and section alarms as well as alarm and status information per timeslot, e.g. per VC-N in SDH, extract automatic protection switching (APS) bytes K1 and K2, and determine primitives for performance monitoring (PM). These meta information are forwarded via the cell switch fabric SF to control system CS which aggregates meta information from all line cards. The protection control block PROT evaluates these data and determines when in case of a failure or signal degrade, protection switching needs to be performed and configures the connectivity map MAP accordingly. The connectivity map MAP is implemented by fabric manager FM as described before: For any kind of connections (unicast and multicast), the fabric manager FM configures the receive side SAR module with connection tags per timeslot, i.e. which addresses will be used per cell for each particular STS-1. For multicast connections, the fabric manager FM additionally configures the fabric elements SE1-SEn and transmit side matrix adapters.

For the purpose of communicating meta information between line cards LC1-LCn and control system CS, the cell switch fabric implements unidirectional flows UNIF1-UNIFn as well as bidirectional flows BIF1-BIFn. Unidirectional flows UNIF1-UNIFn would be needed from line cards LC1-LCn to a processing function PMA for defects, alarms, performance data. For SDH according to ITU-T G.707, communication includes for example alarms such as LOS (loss of signal), LOF (loss of frame), and error monitoring bytes Bx or cumulated performance monitoring information derived from Bx. For OTN according to ITU-T G.709, this includes signals such as TCM (Tandem Connection Monitoring), BDI (Backward Defect Indication), and BEI (Backward Error Indication).

Bidirectional flows BIF1-BIFn will be used for protection communication channels, e.g. K1/K2 in ITU-T G.707, APS in ITU-T G.709 between the line cards LC1-LCn and the protection processing function PROT in the control system CS, and synchronization status byte S1.

The flows have constant bandwidth that allows them to transport all meta data within the required reliability and latency limits. The constant bandwidth is defined by the type of line card, and is instantiated when the line card is installed in the system.

The processing function PMA implements filtering, correlation and reporting of defects and alarms, triggering of consequent actions caused by defects and alarms, and collection and aggregation of performance monitoring data. The protection control function PROT contains transmission protection state machines and triggers reconfiguration of TDM circuits as a result of protection switch events.

The cell switch fabric inherently supports redundancy which is used to address the 1+1 redundancy of the processing function. The control system preferably contains a separate 1+1 redundant pair of controllers and may be implemented in software and/or as FPGAs.

Further to the TDM line cards described in the various embodiments, the network node can additionally be equipped with packet line cards, thus providing a real multi-service switch. Such multi-service network element allows to switch packet as well as synchronous TDM services using a single "type-agnostic" switch matrix. While traditionally, completely distinct networks were used for these two kind of traffic, implementation into a single node allows to have all kind of services within a single network architecture. This saves considerable costs as compared to hybrid network elements, which have both, a TDM matrix for TDM traffic and a separate cell matrix for packet traffic.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks referred to as controllers, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Several functions shown above may or may not be combined into one dedicate hardware or hardware capable of executing software in association with appropriate software.

What is claimed is:

1. A network node for switching time-division multiplex signals, comprising:
    a plurality of line cards;
    a switch fabric interconnecting the plurality of line cards; and
    a control system,
    wherein the switch fabric is a cell based switch comprising one or more switch modules adapted to switch cells of a predefined cell format on the basis of addresses contained in cell headers of the cells,
    wherein the line cards comprise segmentation and reassembly devices for segmenting input time-division multiplex signals into cells of the predefined cell format and adding address information to each cell and for reassembling cells received from the switch fabric into output time-division multiplex signals;
    wherein the control system is connected to a switched port of the switch fabric and exchanges with the line cards control and/or OAM (Operation, Administration and Maintenance) messages over the switch fabric using a cell format supported by the switching fabric;
    wherein the control information comprises configuration messages for configuring the segmentation and reassembly devices of the line cards for provisioning crossconnections through the switch fabric by assigning corresponding cell header addresses; and
    wherein the control information further comprises multicast configuration messages for configuring the segmentation and reassembly devices of the line cards for provisioning multicast crossconnections through the switch fabric by assigning a multicast cell header address and for configuring the switch fabric where to duplicate and switch cells with the multicast cell header address.

2. The network node of claim 1, wherein cells with control and/or OAM messages have local addresses addressing functional entities within the control system or the line cards.

3. The network node of claim 1, wherein the control information comprises configuration messages for configuring the segmentation and reassembly devices of the line cards for provisioning crossconnections through the switch fabric by assigning corresponding cell header addresses.

4. The network node of claim 1, wherein the line cards and/or the control system comprise several functional entities, which are individually addressable through corresponding local addresses.

5. The network node of claim 1, wherein the line cards comprise matrix adapters for interfacing with the switch fabric and wherein the control system comprises an additional matrix adapter.

6. A network node for switching time-division multiplex signals, comprising:
    a plurality of line cards;
    a switch fabric interconnecting the plurality of line cards; and
    a control system,
    wherein the switch fabric is a cell based switch comprising one or more switch modules adapted to switch cells of a predefined cell format on the basis of addresses contained in cell headers of the cells,
    wherein the line cards comprise segmentation and reassembly devices for segmenting input time-division multiplex signals into cells of the predefined cell format and adding address information to each cell and for reassembling cells received from the switch fabric into output time-division multiplex signals;
    wherein the control system is connected to a switched port of the switch fabric and exchanges with the line cards control and/or OAM (Operation, Administration and Maintenance) messages over the switch fabric using a cell format supported by the switching fabric; and
    wherein the OAM information comprises control channel messages from an ECC (embedded communication channel) contained in an overhead area of the time division multiplexed signals and wherein the control system comprises an ECC controller adapted for the routing of the control channel messages towards outgoing embedded control channels, towards other functions of the control system or towards other controllers of the local network node based on addresses contained in the control channel messages.

7. The network node of claim 6, wherein cells with control and/or OAM messages have local addresses addressing functional entities within the control system or the line cards.

8. The network node of claim 6, wherein the control system is adapted to configure control and OAM flows through the switch fabric between the line cards and the control system.

9. The network node of claim 8, wherein the control and OAM flows have a fixed bandwidth.

10. The network node of claim 6, wherein the OAM information comprises meta information derived from received time division multiplexed signals.

11. The network node of claim 6, wherein the control information comprises configuration messages for configuring the segmentation and reassembly devices of the line cards for provisioning crossconnections through the switch fabric by assigning corresponding cell header addresses.

12. The network node of claim 6, wherein the line cards and/or the control system comprise several functional entities, which are individually addressable through corresponding local addresses.

13. The network node of claim 12, wherein the line cards comprise framers, the segmentation and reassembly devices, and matrix adapters, which are all individually addressable.

14. The network node of claim 6, wherein the line cards comprise matrix adapters for interfacing with the switch fabric and wherein the control system comprises an additional matrix adapter.

15. A network node for switching time-division multiplex signals, comprising:
   a plurality of line cards;
   a switch fabric interconnecting the plurality of line cards; and
   a control system,
   wherein the switch fabric is a cell based switch comprising one or more switch modules adapted to switch cells of a predefined cell format on the basis of addresses contained in cell headers of the cells,
   wherein the line cards comprise segmentation and reassembly devices for segmenting input time-division multiplex signals into cells of the predefined cell format and adding address information to each cell and for reassembling cells received from the switch fabric into output time-division multiplex signals;
   wherein the control system is connected to a switched port of the switch fabric and exchanges with the line cards control and/or OAM (Operation, Administration and Maintenance) messages over the switch fabric using a cell format supported by the switching fabric;
   wherein the line cards and/or the control system comprise several functional entities, which are individually addressable through corresponding local addresses; and
   wherein the control system comprises an ECC (embedded communication channel) controller, a fabric manager, a protection control function and a processing function for defects, alarms, and performance data, which are individually addressable.

16. The network node of claim 15, wherein cells with control and/or OAM messages have local addresses addressing functional entities within the control system or the line cards.

17. The network node of claim 15, wherein the control information comprises configuration messages for configuring the segmentation and reassembly devices of the line cards for provisioning crossconnections through the switch fabric by assigning corresponding cell header addresses.

18. The network node of claim 15, wherein the line cards and/or the control system comprise several functional entities, which are individually addressable through corresponding local addresses.

19. The network node of claim 15, wherein the line cards comprise matrix adapters for interfacing with the switch fabric and wherein the control system comprises an additional matrix adapter.

\* \* \* \* \*